May 18, 1926.
S. A. CRONE
1,584,851
SELF LOCKING PIN
Filed Feb. 3, 1925
2 Sheets-Sheet 2
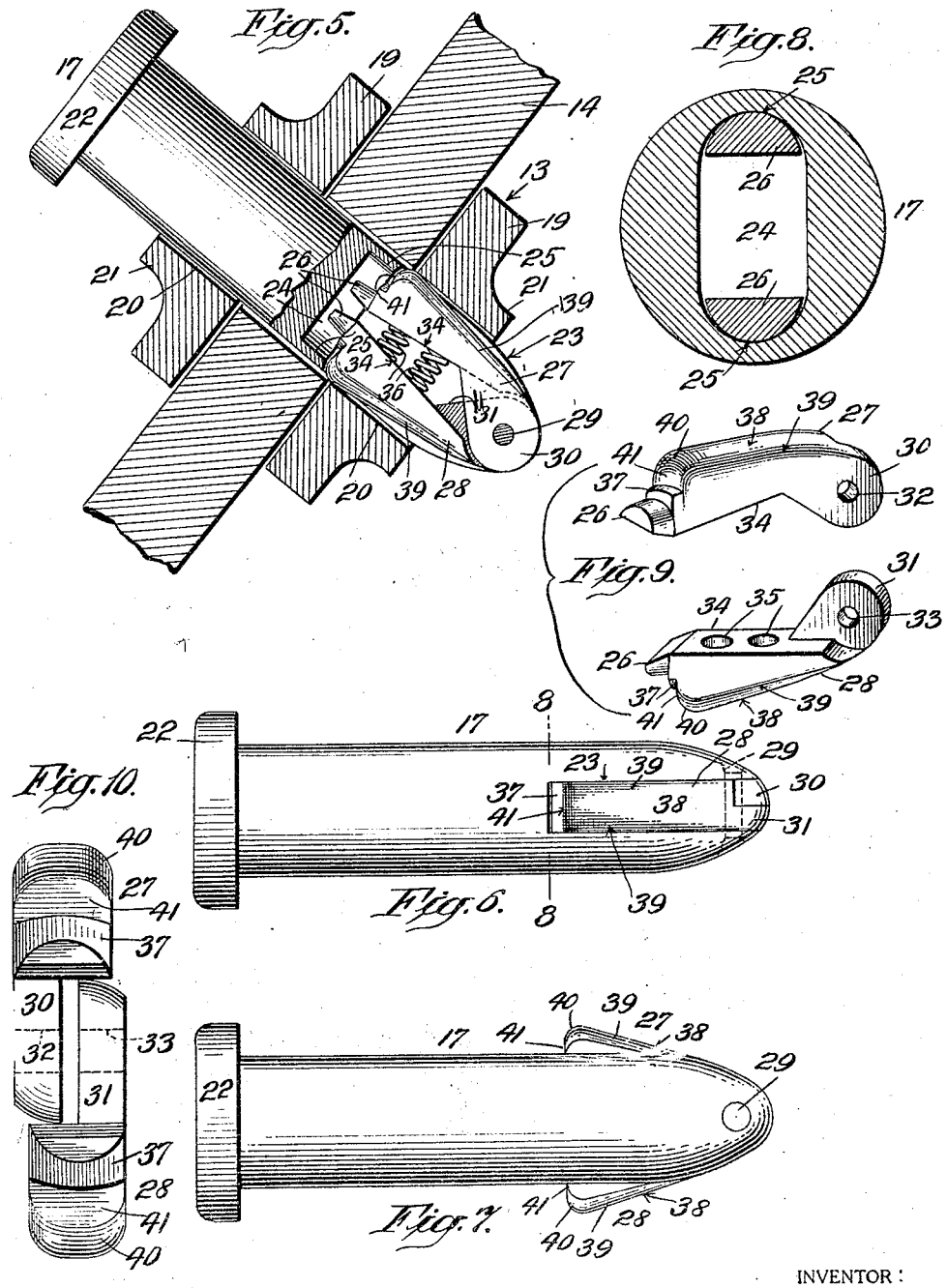
INVENTOR:
SETH A. CRONE.
BY
Charles C. Gill
ATTORNEY.

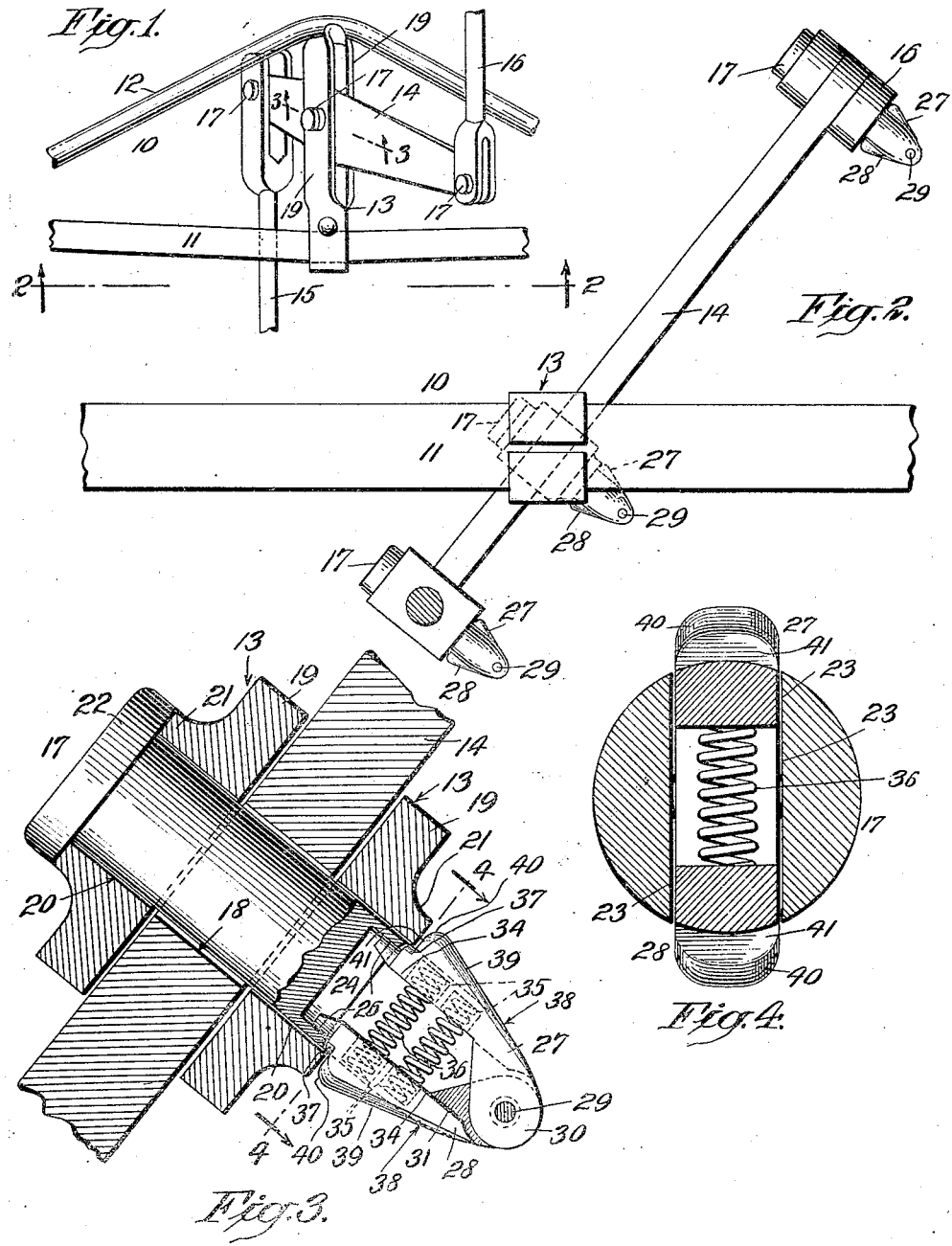

Patented May 18, 1926.

1,584,851

UNITED STATES PATENT OFFICE.

SETH A. CRONE, OF EAST ORANGE, NEW JERSEY, ASSIGNOR TO BUFFALO BRAKE BEAM COMPANY, OF NEW YORK, N. Y., A CORPORATION OF NEW YORK.

SELF-LOCKING PIN.

Application filed February 3, 1925. Serial No. 6,507.

The invention relates to brake beam mechanisms and pertains more particularly to the pins by means of which the several parts of a brake beam mechanism are connected together. These pins have usually been in the form of an integral body, circular in cross-section and having a head on one end and a hole in the other end to receive a cotter key. The pins are employed for pivotally securing the brake lever between the two sides of a strut and also for securing the respective ends of a brake lever to the lower connection rod and to the rod connected with the power-applying means or to a lever guide or brake lever stop, as well as in various other connections.

My invention pertains more particularly to a self-locking pin adapted for use in all of the brake lever mechanism connections and particularly to the pivotal connection of the brake levers with the usual struts of trussed brake beams. My invention is designed to displace the usual pins and cotter keys employed in brake lever mechanisms, and to provide therefor pins, when pushed to position, that will be self-locking and not require the presence of cotter keys or other independent locking or securing members.

A self-locking pin for use in brake lever mechanisms must possess certain characteristics rendering the use of the pins safe, and further, the pins must be of such construction that they may be readily applied to position, self-locking in a secure sense when in their applied position, and capable of being withdrawn from operative position, when necessary. The pins will usually extend through three thicknesses of metal, such as the two sides of a strut and the brake lever, with freedom for play between the brake lever and the sides of the strut, and the self-locking members must be of such construction as will permit the pin to be withdrawn through the three thicknesses of metal without becoming arrested at the corner edges of the holes in said layers and especially in the brake lever and the outer side of the strut.

The self-locking pin of my invention is of the usual construction at one end, whereon is provided the usual head, and at the other end is of special construction and equipped with locking members which are within a slot cut in the outer end of the pin and are pivoted together by a rivet extending transversely through the pin, and these locking means are of special construction at their inner ends and at their inner end portions which constitute the locking features, and also at their inner facing surfaces wherein the locking members are provided with sockets to receive the ends of two interposed springs which are independent of each other and whose action is to press the pivoted locking members outwardly to their locking position, two coiled springs being preferably provided for this purpose because of their superior action over one spring and because in the event of damage to one spring there would still be a spring left to maintain the locking members in their locking position.

The invention will be fully understood from the detailed description hereinafter presented, reference being had to the accompanying drawings, in which:

Fig. 1 is a top view, partly broken away, of a brake beam mechanism having self-locking pins constructed in accordance with and embodying my invention, the pins being employed for securing the brake lever between the sides of the strut, one end of the lever to the lower connection rod and the other end of the lever to the rod leading to the power mechanism;

Fig. 2 is a longitudinal section, partly broken away and on a larger scale, through the same, the section being taken on the dotted line 2—2 of Fig. 1;

Fig. 3 is a sectional view, partly broken away and on an enlarged scale, through the brake lever, strut and safety locking pin of my invention, the section being on the dotted line 3—3 of Fig. 1;

Fig. 4 is a transverse section through the same taken on the dotted line 4—4 of Fig. 3;

Fig. 5 is a view corresponding with Fig. 3, but illustrating the saftety locking pin as either being forced through the strut and brake lever to its operative position shown in Fig. 3, or as being partly retracted therefrom in the act of detaching the pin from the strut and brake lever;

Fig. 6 is a detached side elevation of the safety locking pin;

Fig. 7 is a top view of the same;

Fig. 8 is a vertical transverse section through the same taken on the dotted line 8—8 of Fig. 6;

Fig. 9 is a perspective view of the two locking members detached from the pin, and Fig. 10 is an end elevation of the two locking members shown juxtaposed but detached from the pin and on an enlarged scale, the view being taken from the inner end of said members.

In the drawings 10 designates a portion of a trussed brake beam, 11 denoting the compression member, 12 the truss rod, 13 the strut, 14 a brake lever of usual character, 15 the lower connection rod with which the lower end of said brake lever is pivotally connected, and 16 the power rod with which the upper end of said brake lever is pivotally connected, the pins of my invention being represented at 17. The pins 17 are all alike, and I illustrate them in several connections in Figs. 1 and 2 to indicate that these pins are applicable to the several pivotal parts of brake beam mechanisms.

The brake lever 14 shown on a larger scale in Fig. 3, is formed with the usual pinhole 18, and is secured between the sides 19 of the strut 13 by means of the pin 17, said sides having usual pinholes 20 registering with the pinhole 18 in the lever 14, and said sides also being reinforced around the outer ends of the holes 20, as at 21, as usual.

The pin 17 has a straight body portion and on its outer end is formed with the usual head 22. At its forward end the pin 17 is transversely slotted, as at 23, and tapered forwardly, and at the base of the slot 23 the body of the pin is recessed on approximately elliptical lines, as at 24, the form of this recess being more fully illustrated in Fig. 8. The ends 25 of the recess 24 are of arc outline and form bearings for the semi-circular inwardly projecting arms 26 formed on the locking members 27, 28, respectively. The tapered forward end of the pin 27 is transversely apertured to receive a rivet 29 by means of which the locking members 27, 28 are pivotally secured at their forward ends within the slot 23 of the pin 17.

The features of the forward end of the pin 17 therefore reside in the transverse slot 23, the approximately elliptical recess 24 and the transverse holes to receive the rivet or pivot pin 29.

The locking members 27, 28 at their outer ends are reduced to form overlapping pivot-sections 30, 31, respectively, which project toward each other as knuckles and are formed with holes 32, 33, respectively, which pass into register with each other when said sections 30, 31 are lapped one upon the other. The sections 30, 31 each defines about one-half of the thickness of the locking member of which it forms a part, and these sections 30, 31 are respectively at the outer sides of the forward ends of the locking members so that, when they are lapped one against the other, their combined thickness is that of the thickness of the body portion of the locking members, as shown in Fig. 6.

The holes 32, 33 are provided in the locking members 27, 28, to register with the transverse hole formed in the outer end of the pin to receive the rivet 29, said rivet passing through the holes 32, 33 and serving as the means for pivotally securing the locking members in place.

At their facing sides the locking members 27, 28 are flat, as at 34, and in said members 27, 28 and penetrating said flat sides 34 are formed a plurality of sockets 35 into which are seated the ends of coiled springs 36, these sockets somewhat freely receiving the ends of said springs and being of considerable depth so that the springs 36 may act as springs throughout their length and be given considerable length. The depth of the sockets in the locking members 27, 28 also prevents the springs 36 from escaping from the device.

At their inner ends the locking members 27, 28 are formed with the approximately semi-circular arms 26, hereinbefore referred to, which are substantially of the full thickness of the members 27, 28 and enter the recess 24 and are adapted at their outer curved surfaces to engage the curved end surfaces 25 of said socket 24, as shown in Figs. 3 and 8. The inner ends of the locking members 27, 28 adjacent to the arms 26, are formed with shoulders 37 (Figs. 3, 6, 9 and 10) which, when the locking members are in their operative locking position, shown in Fig. 3, extend over the outer edges of the end walls 25 of the recess 24 and are just within the outer edge of the hole 20 in the adjacent strut-side 19, as shown in Fig. 3, in which position said shoulders form a continuation of the end walls of the body of the pin and occupy the inner edge portions of the slot 23 in the pin and prevent the entrance of dust and the like to said slot and the interior features at the forward end of the pin 17. The outer surfaces of the locking members 27, 28 between their knuckle-ends 30, 31 and the shoulders 37, are on beveled or outwardly inclined converging lines, as shown in Figs. 3, 7 and 9, these lines being of special importance and numbered 38. The outer surfaces 38 of the locking members have rounded corner edges, as at 39, and closely adjacent to the shoulders 37 said surfaces 38 are rounded, as at 40, both along their edges and across their width and inwardly toward flat surfaces or shoulders 41 which are closely adjacent to the shoulders 37. The flat surfaces or shoulders 41 when the locking pin is in operative position, are substantially parallel with the outer surfaces of the adjacent strut side 19, and hence are permitted to abut against the flat surface of said side 19 with no tendency of the locking members 27, 28 being wedged inwardly toward each other into unlocking position. The flat surfaces or shoulders 41 are of considerable importance in the successful utilization of the pins in connection with railway brake mechanisms. The rounded projections 40 at the outer ends of the flat surfaces or shoulders 41 and the rounded edges 39 merging into said rounded projections, are of prime importance in that by reason of their presence the pin when the locking members are squeezed toward each other may be conveniently withdrawn from the strut-sides and brake lever 14. The projections 40 are not only rounded longitudinally but laterally, and this formation of the projections 40 is of very great advantage in preventing the locking members 27, 28 on the widrawal of the pin from operative position, from catching on the corner edges of the holes in the layers of metal through which the locking members 27, 28 must pass. The formation of the projections 40 is also important in permitting the turning of the pin 17 during its withdrawal from operative position, this spiral turning of the pin serving to carry the projections by the shoulders formed at the edges of the holes in the layers of metal through which the pin is obliged to pass. The rounded longitudinal corner edges 39 on the locking members 27, 28 is important in facilitating the introduction of the pin to operative position and its withdrawal therefrom.

The pin 17 is introduced into its operative position by being pushed through the holes 18, 20 in the brake lever and strut sides or through like holes in the other brake lever connections, the locking members 27, 28 spreading outwardly as soon as they have become released by passing through the last layer of material, said members automatically springing outwardly due to the presence of the coiled springs 36 and presenting their flat end surfaces 41 to the strut side or other part so that the pin may effectually resist accidental displacement. When the pin has reached its operative position, shown in Fig. 3, the shoulders 37 extend over the thickness of the ends 25 of the recess 24, and the arms 26 engage the inner walls of said ends, and being of considerable width, they find a firm bearing against said ends 25. The withdrawal of the pin 17 from operative position is effected by squeezing the members 27, 28 toward each other and retracting the pin from the layers of metal through which it had been passed, said pin being given a pulling movement and a turning movement so as to carry the locking members through the holes in the layers of material, the rounded projections 40 serving to prevent the pin from becoming arrested within the mechanism to which the pin may be applied.

What I claim as my invention and desire to secure by Letters Patent, is:

1. In brake-beam mechanisms, the parts of the mechanism being brought into face to face relation and having aligned holes therethrough, a detachable self-locking pin to be passed through said holes for securing said parts together, said pin comprising a body-portion having a head on one end and being longitudinally slotted in the other end and having at the base of said slot a transverse recess, a pair of corresponding oppositely disposed locking-members pivoted at their outer overlapping end portions within the outer end of said slot, and a spring interposed between said locking-members acting to press the rear portions of the same outwardly in opposite directions from said slot, said locking members having forwardly tapered body-portions and at their rear ends having arms which are confined to said transverse recess and engage the end walls of the same, shoulders at the forward ends of said arms to extend laterally over the thickness of said end walls and main projections forwardly of the said shoulders said main projections having flat rear surfaces for presentation to the face of the adjacent part of said mechanism, thereby ensuring safety in locking the pin against accidental displacement.

2. In brake-beam mechanisms, the parts of the mechanism being brought into face to face relation and having aligned holes therethrough, a detachable self-locking pin to be passed through said soles for securing said parts together, said pin comprising a body-portion having a head on one end and being longitudinally slotted in the other end and having at the base of said slot a transverse recess, a pair of corresponding oppositely disposed locking-members pivoted at the outer overlapping end portions within the outer end of said slot, and a spring interposed between said locking-members acting to press the rear portions of the same outwardly in opposite directions from said slot, said locking members having forwardly tapered body-portions and at their rear ends having arms which are of substantially the same width as the locking members and have convex outer surfaces adapted to engage the end walls of said transverse recess, shoulders at the forward ends of said arms to extend laterally over the thickness of said end walls and main projections forwardly of the said shoulders said main projections having flat rear surfaces for presentation to the face of the adjacent part of said mechanism, thereby ensuring safety in locking the pin against accidental displacement.

3. In brake-beam mechanisms, the parts of the mechanism being brought into face to face relation and having aligned holes therethrough, a detachable self-locking pin to be passed through said holes for securing said parts together, said pin comprising a body-portion having a head on one end and being longitudinally slotted in the other end and having at the base of said slot a transverse recess, a pair of corresponding oppositely disposed locking-members pivoted at their outer overlapping end portions within the outer end of said slot, and a spring interposed between said locking-members acting to press the rear portions of the same outwardly in opposite directions from said slot, said locking members having forwardly tapered body-portions and at their rear ends having arms which enter said transverse recess and are adapted to engage the end walls of the same, and main projections having flat rear faces and rounded longitudinal and lateral surfaces, for the purpose described.

4. In brake-beam mechanisms, the parts of the mechanism being brought into face to face relation and having aligned holes therethrough, a detachable self-locking pin to be passed through said holes for securing said parts together, said pin comprising a body-portion having a head on one end and being longitudinally slotted in the other end and having at the base of said slot a transverse recess, a pair of corresponding oppositely disposed locking-members pivoted at their outer overlapping end portions within the outer end of said slot and having spaced apart inner faces containing oppositely disposed sockets, and a plurality of coiled springs mounted at their ends in said sockets and acting to press the locking members outwardly in reverse directions, said locking members having forwardly tapered body portions and at their rear ends having arms which enter said transverse recess and are adapted to engage the end walls of the same and main projections having flat rear faces and rounded longitudinal and lateral surfaces, for the purpose described.

Signed at New York city, in the county of New York and State of New York, this 2nd day of February, A. D. 1925.

SETH A. CRONE.